(12) United States Patent
Ball

(10) Patent No.: US 7,055,129 B2
(45) Date of Patent: May 30, 2006

(54) METHOD AND APPARATUS FOR METRICS APPROVAL MECHANISM

(75) Inventor: Thomas A. Ball, Redwood City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 599 days.

(21) Appl. No.: 10/225,875

(22) Filed: Aug. 22, 2002

(65) Prior Publication Data

US 2004/0046763 A1 Mar. 11, 2004

(51) Int. Cl.
G06F 9/44 (2006.01)

(52) U.S. Cl. .................. 717/107; 717/109; 717/113; 715/763

(58) Field of Classification Search ........ 717/106–119; 715/763, 808–847
See application file for complete search history.

(56) References Cited

U.S. PATENT DOCUMENTS 6,496,209 B1 * 12/2002 Horii ..................... 715/853

OTHER PUBLICATIONS

Sun Microsystems, "Sun StorEdge LibMOM 2.0—Installation and User's Guide", Sun Microsystems Inc., pp. i-xviii, 1-116, 1998.*
Myers, "User Interface Software Tools", ACM, pp.: 64-103, Mar. 1995.*
Post et al., "Iconic Techniques for Feature Visualization", IEEE, pp.: 288-295, 1995.*
"BoundsChecker"; Aug. 27, 2002; pp. 1-2; Compuware Corporation 2002; http://www.compuware.com/products/devpartner/bounds/.

* cited by examiner

Primary Examiner—Ted T. Vo
(74) Attorney, Agent, or Firm—Osha Liang LLP

(57) ABSTRACT

A method of modifying a metrics feedback icon for a software component involves displaying the metrics feedback icon for the software component, generating a user prompt if a user selects the software component, obtaining an approval response to the user prompt, and modifying the metrics feedback icon if a value of the approval response equals a predetermined value.

32 Claims, 6 Drawing Sheets

METHOD AND APPARATUS FOR METRICS APPROVAL MECHANISM

BACKGROUND OF INVENTION

Software testing is essential to developing quality software products. Software testing involves operating a software application or a software system under a set of controlled conditions and evaluating the results. There are a variety of software tests which software applications may be subjected to, e.g., black box testing, white box testing, integration testing, regression testing, stress and load testing, usability testing, etc. Each software test allows a measurement of the actual performance of the software application versus desired performance of the software application.

Testing tools are another aspect of software testing. A variety of automated tools exist for testing software applications, e.g., code analyzers, coverage analyzers, memory analyzers, load and performance tools, web test tools, test case management tools, bug reporting, etc. Many of the tools mentioned above use static analysis, which involves inspection of source code of software when the software is not being executed.

Testing, and in particular, software testing in conjunction with testing tools, is often introduced in the latter stages of a software development process. There are often separate groups or teams involved in the software development process, e.g., a development team, a management team, and a testing team. The development team often includes software engineers, programmers, etc. The management team may include software architects, team leaders, etc. The testing team includes test engineers, software testers, etc. FIG. 1 shows a flow chart of a typical software development process. The process begins with an initial concept of a software system (Step 10). The necessary requirements of the software system are determined (Step 12), and functional design of the software system is prepared (Step 14). Additional designs are generated for internal functions, and plans for the documentation and tests are prepared (Step 16). The management team is typically involved in generating designs and documentation plans.

The software system is coded (Step 18). Typically, a development tool, such as an Integrated Development Environment (IDE) is used by members of the development team, especially code developers. The IDE is a programming environment that has been packaged as a software application, and normally includes a code editor, a compiler, a debugger, and often a Graphical User Interface (GUI) builder. IDE's vary in complexity, from a simple editor with a compiler and possibly debugger extensions, to a complex development application which includes facilities to support teamwork, such as access to a shared code depository.

Documentation supporting the system is prepared (Step 20), and then the software testing begins (Step 22). The testing team or a group aside from the development team usually performs testing, but in some instances the development team may perform testing. Any maintenance or updates are implemented as a result of the testing (Step 24), i.e., identified bugs are addressed.

The software system may be re-tested (Step 26) and additional maintenance is implemented, if necessary (Step 28). The software development process described above is commonly known as a Systems Development Life Cycle model (SDLC model) and occasionally referred to as a "waterfall model." The SDLC model is an iterative process and usually proceeds in strict order.

Often, use of an SDLC model for software development results in a flow of information such that the development team and the testing team communicate with each other. For example, the management team relays requirements and designs to the development team. Similarly, the management team relays testing requirements and test plans to the testing team. The test requirements and test plans include criteria by which the software application is to be evaluated. Once software testing begins, issues regarding performance found by the testing team are discussed with the management team.

Metrics are often used to provide objective criteria for evaluation of software applications. Metrics focus on issues of complexity, extensibility, modularity, readability, etc. Particular aspects of software applications may be quantified using metrics attributes. Metrics attributes are measurements used in software tests to locate potential problem areas within the software application. Different than a "bug," metrics attributes are desired standards in the design and operation of the software application, rather than mistakes or errors in the functionality of the software application. Testing "good code" is not purely a consideration of error-free code; instead "good code" is considered for complexity, extensibility, modularity, readability, etc. Testing tools are often used to determine values of metrics attributes. Formulas may be used to calculate numerical values for particular metrics attributes.

Metrics may be oriented towards a particular design or programming paradigm. For example, object-oriented metrics attributes are metrics designed specifically to evaluate the performance of object-oriented code. Examples of objected-oriented metrics attributes include Depth of Inheritance Tree (DIT), Number of Children (NOC), Coupling Between Objects (CBO), Weighted Methods per Class (WMC), Response for Class (RFC), Nesting Tree (NT), Message Passing Coupling (MPC), etc. Each metrics attribute, object-oriented or otherwise, provides different information as to quality of the object-oriented code; the information may relate to functions, classes, or an entire software system. For example, MPC is a measure of message passing among classes, indicating a measure of coupling between a class and an entire software system. Determining a value of MPC provides an indication of software application complexity. Although a measured value of a metrics attribute may be out-of-bounds (either high or low), the software application may not necessarily be flawed. Metrics attributes give guidance as to desired standards, but are not necessarily mandates.

Many techniques may be used to determine values of metrics attributes. One such technique is static analysis. Static analysis is a process of examining source code or compiled code without executing the source code or compiled code. Static analysis is typically used to locate problem areas in the source code or compiled code, e.g., potential bugs, unnecessary complexity, or high maintenance areas. Several mechanisms (similar to compilers) are used to perform static analysis, e.g., lexical or binary scanning, parsing, semantic analysis, data flow analysis, etc.

For example, after testing an object-oriented software application, a value of the MPC metrics attribute of Class X may be found to be high, indicating Class X is strongly coupled. Strongly coupled classes are closely tied together, so that modifications attempted to one class are more likely to affect the other class, should modification be required. In a typical scenario, the MPC metrics attribute, along with other metrics attributes, are compiled into performance reports and discussed with the management team. The management team suggests improvements to problem areas in the source code, e.g., to improve the message coupling of Class X. The improvements are communicated to the development team for resolution. There is a definite cost associated with time, money, resources (tools and people), and space expended to develop a software system using this process.

SUMMARY OF INVENTION

In general, in one aspect, the invention relates to a method of modifying a metrics feedback icon for a software component. The method comprises displaying the metrics feedback icon for the software component, generating a user prompt if a user selects the software component, obtaining an approval response to the user prompt, and modifying the metrics feedback icon if a value of the approval response equals a predetermined value.

In general, in one aspect, the invention relates to a metrics approval system. The metrics approval system comprises a software component comprising a metrics attribute, a metrics feedback icon indicating an alarm-status of the metrics attribute, and a development tool for obtaining an approval response from a user and modifying the metrics feedback icon if a value of the approval response is equal to a predetermined value.

In general, in one aspect, the invention relates to a metrics approval system. The metrics approval system comprises a metrics attribute, a metrics feedback icon indicating an alarm-status of the metrics attribute, a development tool for obtaining an approval response from a user and modifying the metrics feedback icon if a value of the approval response is equal to a predetermined value, a dialog box used to obtain the approval response, and a data store comprising an approval information file comprising a value of the metrics attribute.

In general, in one aspect, the invention relates to a computer system for modifying a metrics feedback icon for a software component. The computer system comprises a processor, a memory, a storage device, a computer display, and software instructions stored in the memory for enabling the computer system under control of the processor, to perform generating a user prompt on the computer display if a user selects the software component, obtaining an approval response to the user prompt, and modifying the metrics feedback icon if a value of the approval response equals a predetermined value.

In general, in one aspect, the invention relates to an apparatus for modifying a metrics feedback icon of a software component. The apparatus comprises displaying the metrics feedback icon for the software component, generating a user prompt if a user selects the software component, obtaining an approval response to the user prompt, and modifying the metrics feedback icon if a value of the approval response equals a predetermined value.

Other aspects and advantages of the invention will be apparent from the following description and the appended claims.

DETAILED DESCRIPTION

Figure 1:
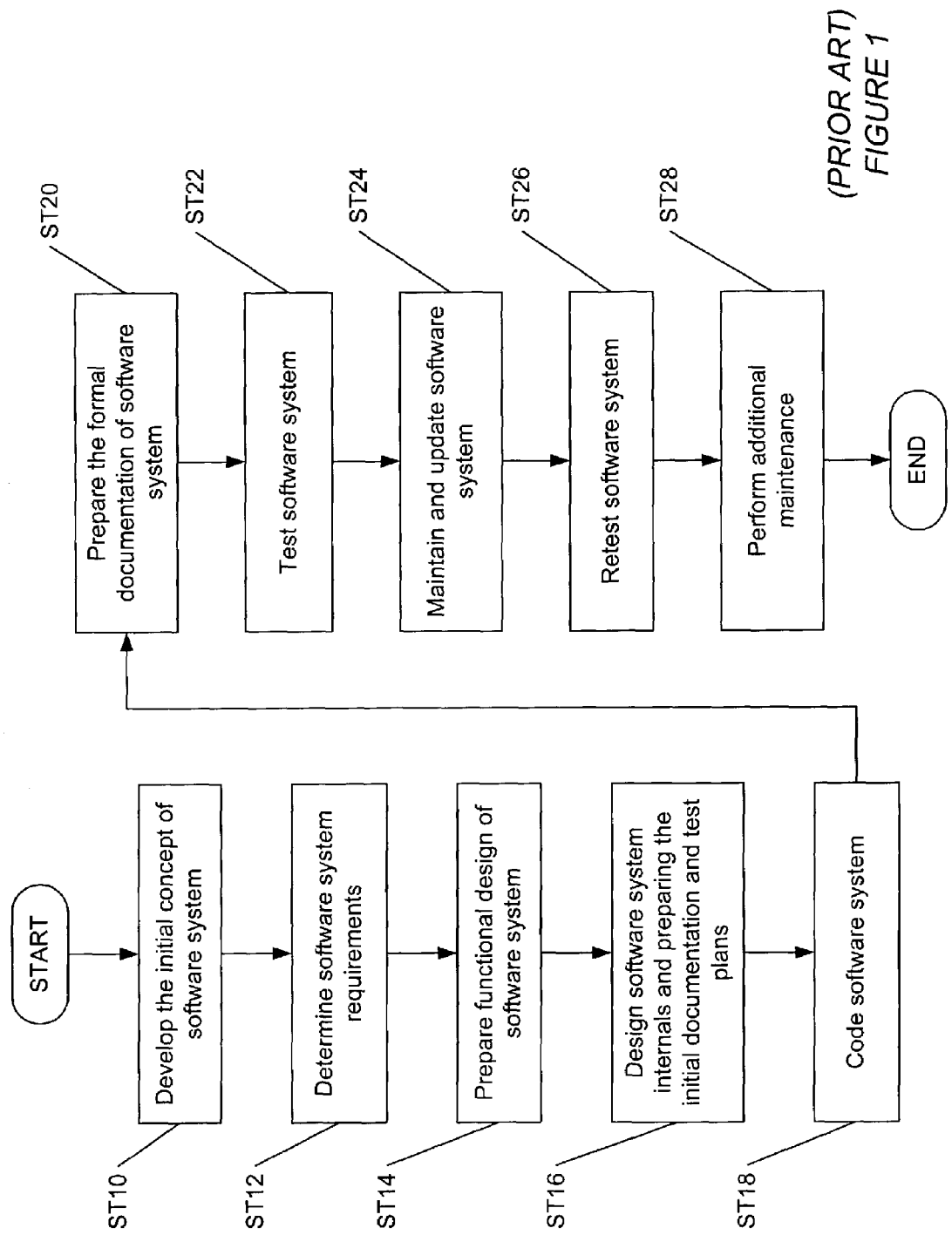
FIG. 1 shows a software development process.

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
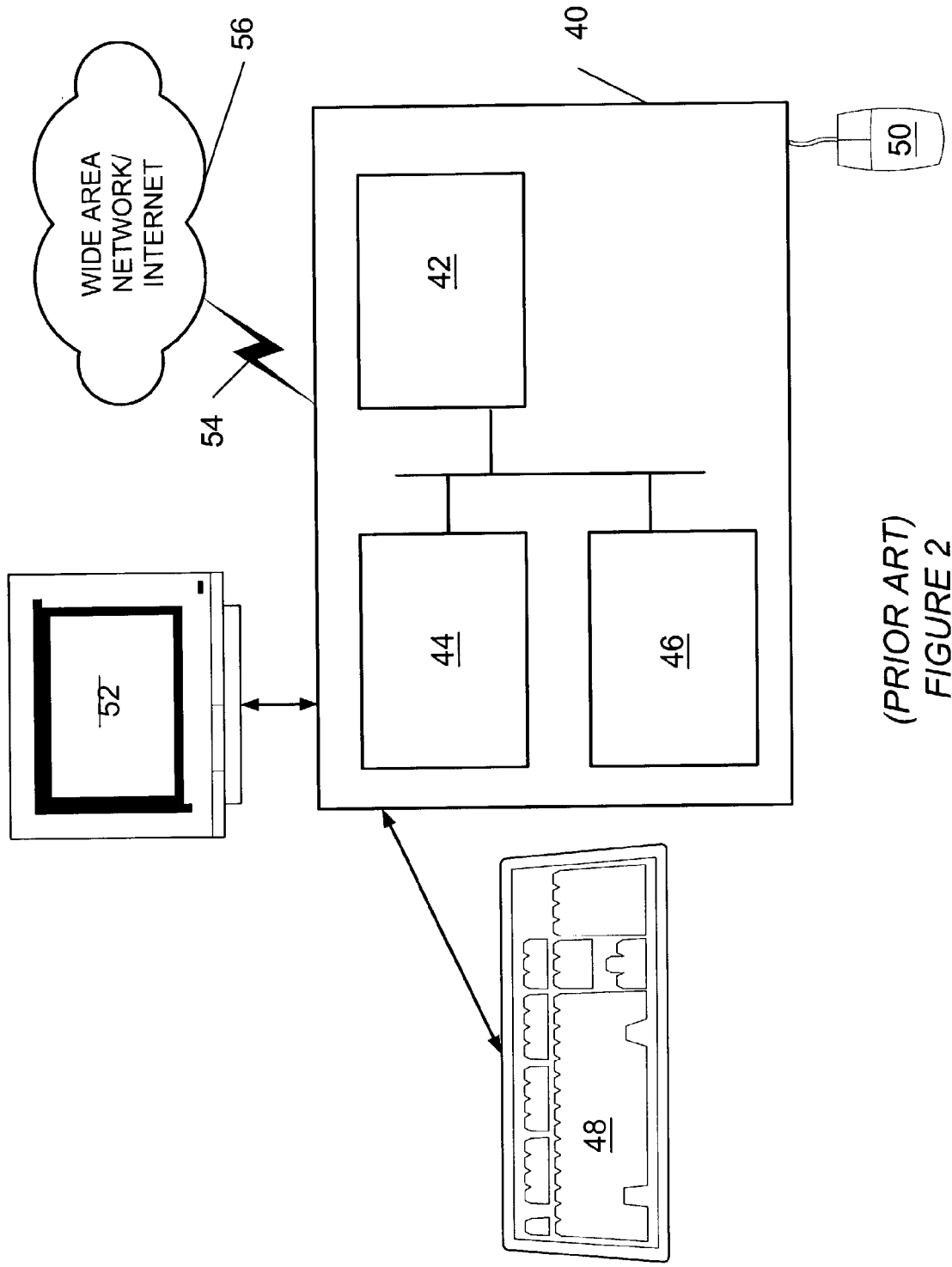
FIG. 2 shows a typical computer system.

The invention may be implemented on virtually any type computer regardless of the platform being used. For example, as shown in FIG. 2, a typical computer (40) includes a processor (42), an associated memory (44), a storage device (46), and numerous other elements and functionalities typical of today's computers (not shown). The computer (40) may also include input means, such as a keyboard (48) and a mouse (50), and an output device, such as a monitor (52). Those skilled in the art will appreciate that these input and output means may take other forms in an accessible environment. The computer (40) may be connected via a network connection (54) to a Wide Area Network (WAN) (56), such as the Internet.

Feedback as to values of metrics attributes may be useful during development of a software application. For example, a user, such as a developer, a software engineer, etc., may develop a software application using a development tool (e.g., an IDE), and each software component (i.e., each class, each method, etc.) included in the software application may be associated with one or more metrics attributes (e.g., each class may be associated with an NOC metrics attribute, a CBO metrics attribute, a WMC metrics attribute, etc.). Predetermined limits may be set for values of the metric attribute (e.g., a limit of 15 may be set for the NOC metrics attribute, such that 15 is a desired maximum number of subclasses for any class).

Figure 3:
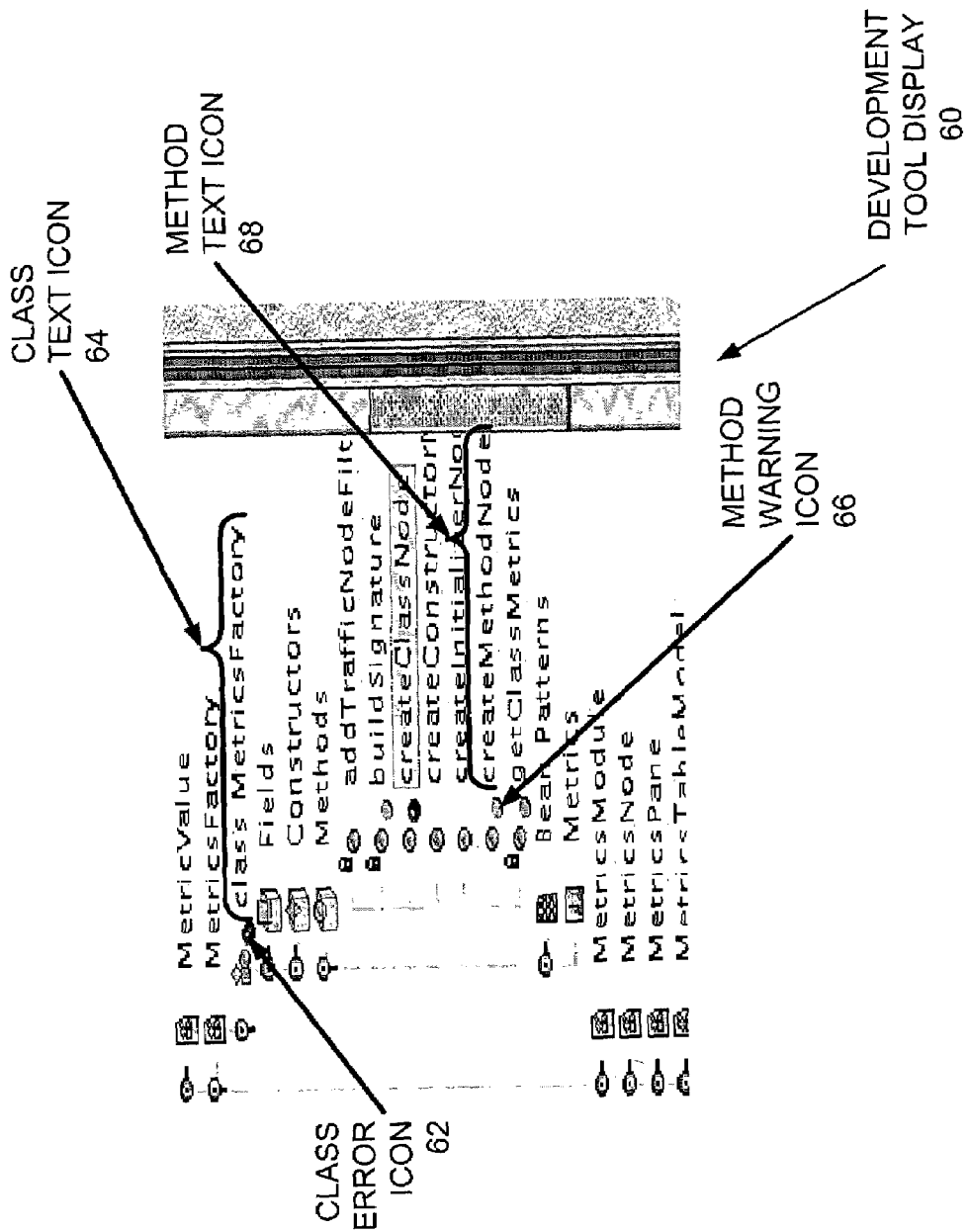
FIG. 3 shows a development tool display with metrics feedback icons in accordance with one or more embodiments of the invention.

In order to facilitate feedback to the user as to out-of-bounds values of metrics attributes associated with each software component, a metrics feedback icon is displayed via the development tool as an alarm for the user. The metrics feedback icon may be displayed with certain colors representing certain alarm statuses. For example, a yellow metrics feedback icon may represent a warning status, and a red metrics feedback icon may represent an alarm status. FIG. 3 shows a development tool display (60) displaying a class error icon (62) adjacent to a class text icon (64) representing a MetricsFactory class and a method warning icon (66) adjacent to a method text icon (68) representing a createMethodNode method. In accordance with one or more embodiments of the invention, the class error icon (62) is red, and the method warning icon (66) is yellow. The development tool display (60) in accordance with one ore more embodiments of the invention, is a Graphical User Interface (GUI) (e.g., a "window").

Metrics feedback icons, such as the class error icon (62) and the method warning icon (66), indicate that a software component (e.g., a class or method) is associated with one or more associated metrics attributes (e.g., NOC, MPC, etc.) that have out-of-bounds values with respect to a predetermined limit set for the metrics attribute. For example, the class error icon (62) associated with the MetricsFactory class may, for example, indicate that the MetricsFactory class has too many subclasses, or that the MetricsFactory class is too tightly coupled.

However, metrics attributes are generally not considered as mandates, but as guidelines. For example, the user, upon observing the class error icon adjacent to the MetricsFactory class, may examine source code of the MetricsFactory class and determine that the MetricsFactory class is not too tightly coupled, or does not have too many subclasses, as the case may be. However, although the MetricsFactory class is, according to the user, appropriately constructed, continued display of the class error icon may distract the user's attention away from other metrics feedback icons, which may represent actual problems with the software application.

In order to indicate that an alarm-status metrics attribute is appropriate for a particular software component, the user may wish to approve of the metrics feedback icon displayed adjacent to a text icon representing the software component. Approving of the alarm-status metrics attribute may be accomplished via multiple mechanisms and/or agencies, e.g., using a dialog box. By approving of the metrics feedback icon that is displayed by the development tool, the user thereby indicates that the alarm-status metrics attribute is appropriate for the software component, and the metrics feedback icon is altered or no longer displayed, in order to represent approval by the user of the metrics feedback icon. If the user does not approve of the metrics feedback icon, the metrics feedback icon continues to be displayed by the development tool.

Figure 4:
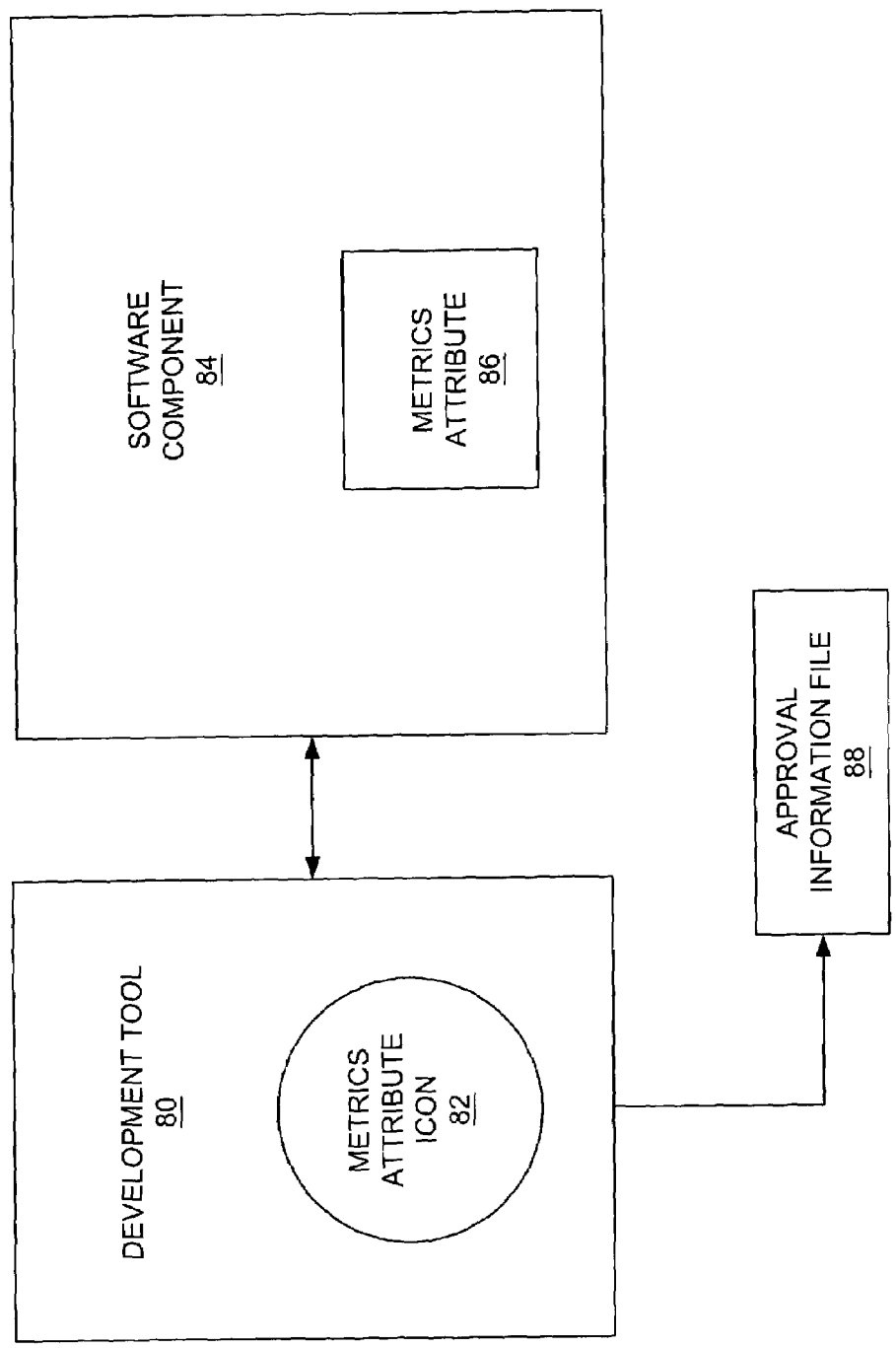
FIG. 4 shows entities used in a metrics approval mechanism in accordance with one or more embodiments of the invention.

In accordance with one or more embodiments of the invention, entities used with a metrics approval mechanism for a user of a development tool (e.g., the user) are shown in FIG. 4. The development tool (80) may be an IDE, or may include an IDE or any software application capable of developing software. The development tool (80) includes a metrics feedback icon (82). The metrics feedback icon (82) may be a single metrics feedback icon, or multiple metrics feedback icons. The metrics feedback icon (82), in accordance with one or more embodiments of the invention, may be a colored icon displayed using a class explorer window of an IDE.

The development tool (80) is connected to a software component (84). For example, the development tool (80) may be connected to the software component (84) through an operating system. The software component (84) includes a metrics attribute (86). The software component (84), in one or more embodiments of the invention, may be a construct of an object-oriented software application, such as a class or a method. Alternatively, the software component (84) may represent the entire object-oriented software application, or some portion thereof, such as a block of source code. The metrics attribute (86) represents metrics information regarding the software component (84). The software component (84) may represent one or more software components (e.g., one or more classes, methods, etc.), and the metrics attribute (86) may represent multiple metrics attributes (e.g., NOC, NT, WMC, etc). For example, the software component (84) may represent an object-oriented software application that includes multiple classes and multiple methods.

The development tool (80) is operatively connected (e.g., via an operating system) to an approval information file (88). The approval information file (88), in accordance with one or more embodiments of the invention, may be a per-directory text file, and may support an Extensible Markup Language (XML) format, although other file formats besides XML may be used. The approval information file (88) may be included as part of a source code control system, or may be connected to the source code control system. The source code control system may be, in accordance with one or more embodiments of the invention, a networked system enabling multiple users to access the approval information file (88) for in order to track file histories using the development tool (80), or another appropriate mechanism.

The software component (84), the metrics attribute (86), and the approval information file (88) may exist as a data store on secondary storage (e.g., a hard drive, a tape drive, etc.) as part of one or more computer systems as one or more discrete units, or may exist in volatile memory (e.g., Random Access Memory (RAM), etc.) on one or more computer systems. Those skilled in the art will realize that entities shown in FIG. 4 may differ in size, configuration, or number, in accordance with one or more embodiments of the present invention.

Figure 5:
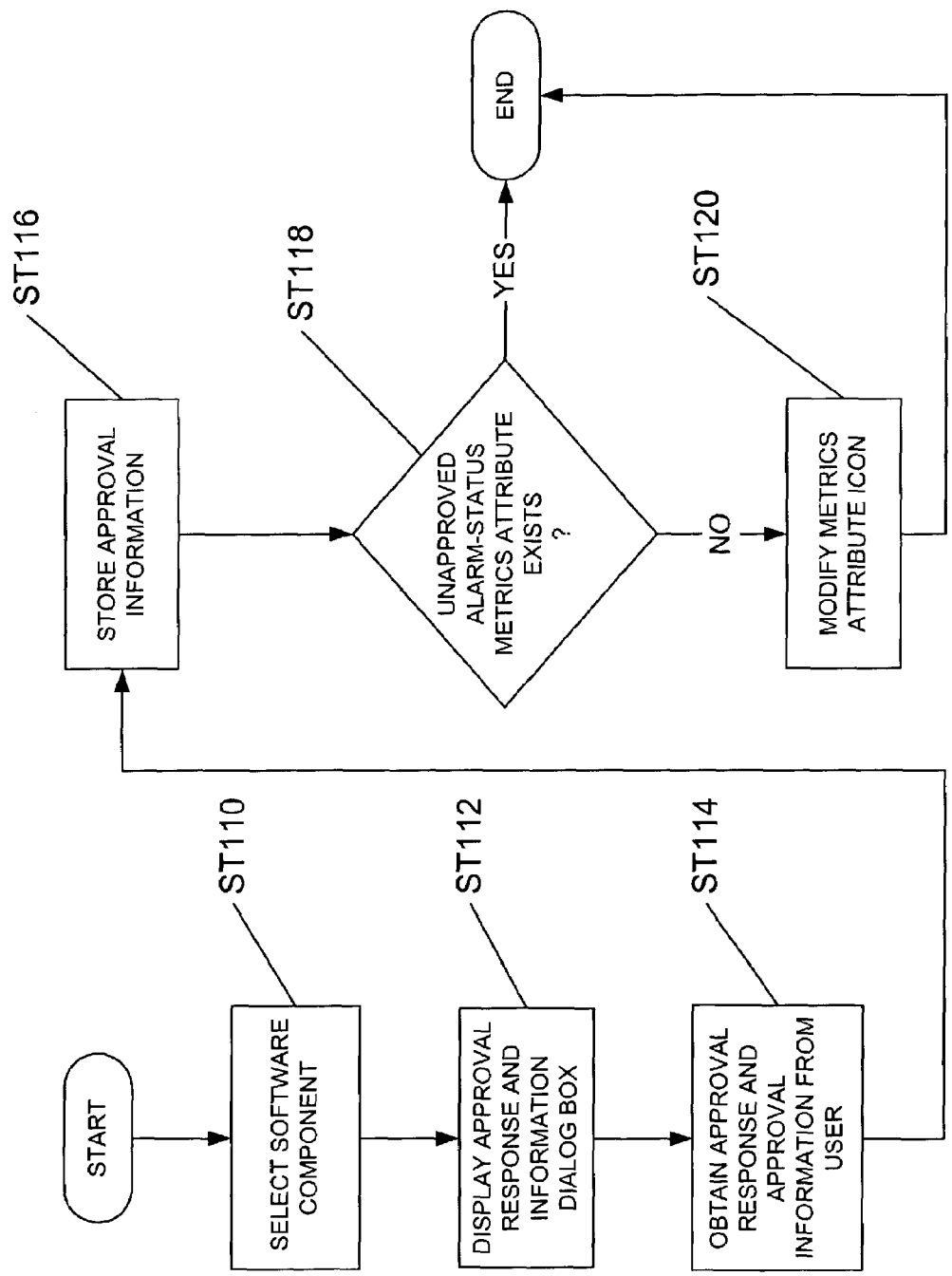
FIG. 5 shows a sequence of operation for using the metrics approval mechanism in accordance with one or more embodiments of the invention.
Figure 6:
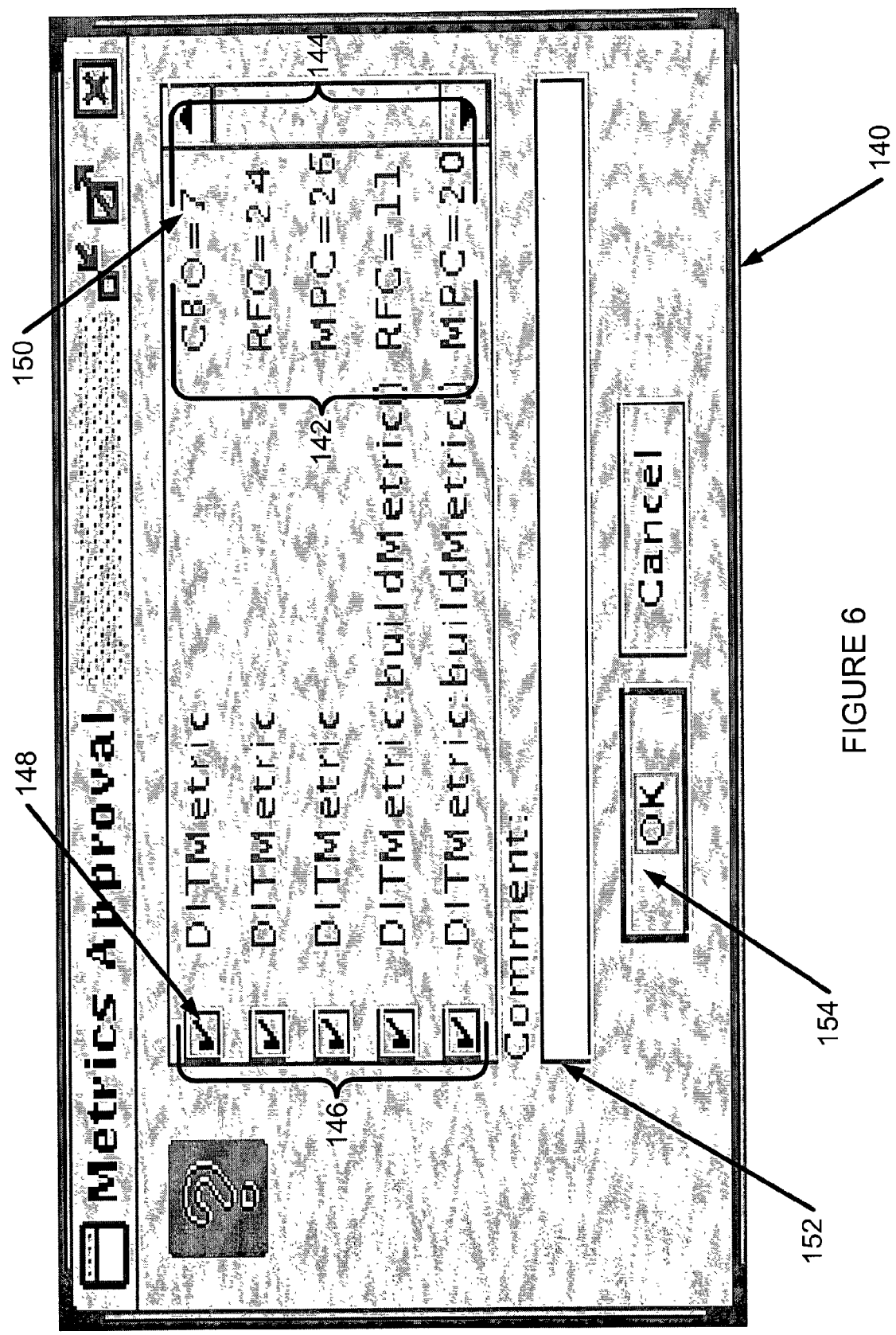
FIG. 6 shows an approval dialog box in accordance with one or more embodiments of the invention.

FIG. 5 shows a sequence of operations for using the metrics approval mechanism. A user of the development tool (e.g., the user), observing the metrics feedback icon displayed by the development tool, selects the software component (which is represented by a text icon adjacent to the metrics feedback icon) (Step 110). Selecting the text icon adjacent to the software component may be accomplished by, for example, using a mouse to click or double-click on the text icon. Selecting the text icon triggers display of a user prompt, such as an approval dialog box (as shown in FIG. 6 and described below) (Step 112). The approval dialog box, in accordance with one or more embodiments of the invention, displays current values of alarm-status metrics attributes associated with the software component. Adjacent to a text icon representing each alarm-status metrics attribute is a check box, which the user may check (i.e., click upon with the mouse) in order to indicate approval.

FIG. 6 shows an example of the approval dialog box (140). The approval dialog box (140) shows a list of test icons representing the alarm-status metrics attributes (142) and a list of current values of the alarm-status metrics attributes (144). Also shown is a list of check boxes (146) corresponding to the alarm-status metrics attributes. For example, a CBO check box (148) is checked, indicating that a CBO metrics attribute value (150) equal to 7 is appropriate for the software component, even though CBO metrics attribute is classified as "out-of-bounds."

Referring to FIG. 5, the approval dialog box (140 in FIG. 6) is used to obtain an approval response and approval information from the user (Step 114).

The approval response, in accordance with one or more embodiments of the invention, is a numerical value indicating which, if any, of the list of check boxes (146 in FIG. 6) are checked by the user. For example, if the user checked the CBO check box (148 in FIG. 6), the numerical value may be equal to 2. Additional, unique numerical values result from checking other check boxes, or combinations of check boxes of the list of check boxes (146 in FIG. 6). If the user does not approve (by checking an appropriate check box) an alarm-status metrics attribute that is represented by a metrics feedback icon, appropriate measures (e.g., analysis by the testing team and/or the development team of the software component for possible improvement).

The approval information, in accordance with one or more embodiments of the invention, is obtained using a text box, as shown in FIG. 6. The text box (152) enables the user to enter pertinent information, such as explanatory comments, e.g., reasons for approving, or not approving, alarm status metrics attributes. The user may click an "OK" button (154) to indicate that approval is complete.

Referring to FIG. 5, after the user clicks the "OK" button (154 in FIG. 6), the approval information is stored (Step 116). Additional information may be included as part of the approval information, such as a time and date of approval, an identification of the user (e.g., user logon information) and current values of approved alarm-status metrics attributes. The approval information is stored in a data store (such as a file on a network-accessible or standalone hard drive). The approval information, in accordance with one or more embodiments of the invention, may be included in a source code control system, or may be accessible to the source code control system, and is stored, for example, as a per-directory, XML-compliant text-file.

Using the numerical value of the approval response, a determination is made as to whether an unapproved, alarm-status metrics attribute associated with the software component exists (Step 118). For example, if the user does not check the CBO check box (148 in FIG. 6), and a desired maximum value for the CBO metrics attribute is equal to 6, then a result of the determination of Step 118 is that an unapproved, alarm-status metrics attribute does exist. The metrics attribute is described as "alarm-status" because, for the example shown in FIG. 6, the CBO metrics attribute value (150 in FIG. 6) is equal to 7, which is above the desired maximum value of 6. Therefore, attention to the alarm-status metrics attribute may be necessary.

If no unapproved, alarm-status metrics attributes associated with the software component exist, the metrics feedback icon is modified (Step 120). Modifying the metrics feedback icon indicates that approval has occurred for each alarm-status metrics attribute associated with the software component. Modifying the metrics feedback icon may be accomplished, in accordance with one or more embodiments of the present invention, by removing the metrics feedback icon from a display so that the user cannot see the metrics feedback icon. Alternatively, a color of the metrics feedback icon may be altered (e.g., changed from red or yellow to green). Otherwise, if one or more unapproved, alarm-status metrics attributes associated with the software component do exist, the metrics feedback icon is not modified.

A modified metrics feedback icon may be restored if a metrics attribute that was previously approved later changes value so as to become undesirable. For example, as the user continues to develop the software application that includes the software component, the metrics feedback icon may re-appear, if, after recompiling the software application, the value of the metrics attribute associated with the metrics feedback icon has changed so as to become more out-of-bounds.

Those skilled in the art will appreciate that operations shown in FIG. 5 and the approval dialog box shown in FIG. 6 may vary in accordance with one or more embodiments of the invention. For example, the approval dialog box may display metrics attributes associated with the software component that are not out-of-bounds, in addition to metrics attributes associated with the software component that are out-of-bounds.

Advantages of embodiments of the invention may include one or more of the following. Provision is made for modifying metrics attribute feedback icons in order to indicate that a particular value of an alarm-status, out-of-bounds metrics attribute or metrics attributes are acceptable. Thus, by removing from the user's attention potentially distracting and irrelevant metrics feedback icons, a user of the development tool is able to focus on other possible problem areas, other than the alarm-status, out-of-bounds metrics attributes that are approved, and that are therefore acceptable. By narrowing the user's focus, software development is enhanced, thus providing cost and quality improvements. Approval information is stored as text for ease of modification, thus improving user experience. Furthermore, because the approval information is accessible through a source code control system, access to approvals is available to multiple teams on a project.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of modifying a metrics feedback icon for a software component, comprising:
   displaying the metrics feedback icon for the software component, wherein the metrics feedback icon indicates that the software component is associated with at least one metrics attribute, wherein the at least one metrics attribute specifies a desired standard in the design of the software component, and wherein the desired standard is quantified by a predetermined out-of-bound value;
   generating a user prompt if a user selects an icon representing the software components, wherein the user prompt displays a current value of the at least one metrics attribute;
   obtaining an approval response for the at least one metrics attribute using the user prompt; and
   modifying an appearance of the metrics feedback icon if the current value of the at least one metrics attribute is approved.

2. The method of claim 1, wherein the metrics feedback icon is displayed within a development tool.

3. The method of claim 2, wherein the development tool is an integrated development environment.

4. The method of claim 1, wherein the user prompt is a dialog box.

5. The method of claim 1, further comprising:
   obtaining approval information from the user; and
   storing the approval information as a data store.

6. The method of claim 1, further comprising:
   restoring the metrics feedback icon if a value of a metrics attribute changes to an undesirable value after the approval response is obtained.

7. The method of claim 1, further comprising:
   obtaining approval information from the user;
   storing the approval information as a data store; and
   restoring the metrics feedback icon if a value of a metrics attribute changes to an undesirable value after the approval response is obtained.

8. The method of claim 5, the approval information comprising an identification of the user.

9. The method of claim 5, the approval information comprising a value of the metrics attribute of the software component.

10. The method of claim 5, the approval information comprising an approval comment comprising explanatory text from the user.

11. The method of claim 5, the approval information comprising a time and a date of the approval response.

12. The method of claim 5, wherein the approval information is accessible from a source code control system.

13. The method of claim 1, modifying the metrics feedback icon comprising removing the metrics feedback icon from a graphical user interface.

14. The method of claim 1, modifying the metrics feedback icon comprising altering an appearance of the metrics feedback icon.

15. A metrics approval computer system, comprising:
   a software component embodied in a computer storage medium comprising a metrics attribute, wherein the metrics attribute specifies a desired standard in the design of the software component, and wherein the desired standard is quantified by a predetermined out-of-bound value;
   a metrics feedback icon indicating an alarm-status of the metrics attribute, wherein the alarm-status indicates that the predetermined out-of-bound value of the metrics attribute has been reached; and
   a development tool for obtaining an approval response for the alarm-status of the metrics attribute from a user and modifying an appearance of the metrics feedback icon if a current value of the metrics attribute is approved by the user.

16. The metrics approval system of claim 15, wherein obtaining the approval response is triggered by the user selecting the software component.

17. The metrics approval system of claim 15, further comprising a dialog box used to obtain the approval response.

18. The metrics approval system of claim 15, further comprising a data store comprising an approval information file comprising a value of the metrics attribute.

19. The metrics approval system of claim 18, wherein the approval information file is a text file.

20. The metrics approval system of claim 18, the approval information file comprising an approval comment from the user.

21. The metrics approval system of claim 18, the approval information file comprising an identification of the user.

22. The metrics approval system of claim 18, the approval information file comprising a time and date of the approval response.

23. The metrics approval system of claim 18, wherein the approval information file is accessible from a source code control system.

24. The metrics approval system of claim 15, wherein the development tool is an integrated development tool.

25. A metrics approval system, comprising:
   a software component comprising a metrics attribute, wherein the metrics attribute specifies a desired standard in the design of the software component, and wherein the desired standard is quantified by a predetermined out-of-bound value;
   a metrics feedback icon indicating an alarm-status of the metrics attribute, wherein the alarm-status indicates that the predetermined out-of-bound value of the metrics attribute has been reached;
   a development tool for obtaining an approval response for the alarm-status of the metrics attribute from a user and modifying an appearance of the metrics feedback icon if a current value of the metrics attribute is approved by the user;
   a dialog box used to obtain the approval response; and
   a data store comprising an approval information file comprising a value of the metrics attribute.

26. A computer system for modifying a metrics feedback icon for a software component, comprising:
   a processor;
   a memory;
   a storage device;
   a computer display; and
   software instructions stored in the memory for enabling the computer system under control of the processor, to perform:
   generating a user prompt on the computer display if a user selects an icon representing the software component, wherein the user prompt displays a current value of at least one metrics attribute, wherein the at least one metrics attribute specifies a desired standard in the design of the software component, and wherein the desired standard is quantified by a predetermined out-of-bound value;
   obtaining an approval response for the at least one metrics attribute using the user prompt; and
   modifying an appearance of the metrics feedback icon if the current value of the at least one metrics attribute is approved.

27. The computer system of claim 26, wherein the user prompt is a dialog box.

28. The computer system of claim 26, wherein the metrics feedback icon is displayed within a development tool.

29. The computer system of claim 28, wherein the development tool is an integrated development environment.

30. The computer system of claim 26, modifying the metrics feedback icon comprising removing the metrics feedback icon from a graphical user interface.

31. The computer system of claim 26, modifying the metrics feedback icon comprising altering an appearance of the metrics feedback icon.

32. An apparatus for modifying a metrics feedback icon of a software component, comprising:
   means for displaying the metrics feedback icon for the software component, wherein the metrics feedback icon indicates that the software component is associated with at least one metrics attribute, wherein the at least one metrics attribute specifies a desired standard in the design of the software component, and wherein the desired standard is quantified by a predetermined out-of-bound value;
   means for generating a user prompt if a user selects an icon representing the software component, wherein the user prompt displays a current value of the at least one metrics attribute;
   means for obtaining an approval response for the at least one metrics attribute using the user prompt; and
   means for modifying an appearance of the metrics feedback icon if the current value of the at least one metrics attribute is approved.

* * * * *